(12) United States Patent
Tyler et al.

(10) Patent No.: US 8,214,232 B2
(45) Date of Patent: Jul. 3, 2012

(54) HEALTHCARE INSURANCE CLAIM FRAUD DETECTION USING DATASETS DERIVED FROM MULTIPLE INSURERS

(75) Inventors: Michael Tyler, San Diego, CA (US); Nitan Basant, Bangalore (IN); Robin P, Bangalore (IN); Shafi Rahman, Bangalore (IN)

(73) Assignee: Fair Isaac Corporation, Minneapolis, MN (US)

( * ) Notice: Subject to any disclaimer, the term of this patent is extended or adjusted under 35 U.S.C. 154(b) by 231 days.

(21) Appl. No.: 12/765,651

(22) Filed: Apr. 22, 2010

(65) Prior Publication Data

US 2011/0264459 A1 Oct. 27, 2011

(51) Int. Cl.
*G06Q 10/00* (2012.01)
(52) U.S. Cl. .................. 705/2; 705/3; 705/4; 706/12

(58) Field of Classification Search .............. 705/2–4; 706/12
See application file for complete search history.

(56) References Cited

U.S. PATENT DOCUMENTS

| 2008/0010304 A1* | 1/2008 | Vempala et al. ............ 707/100 |
| 2010/0114607 A1* | 5/2010 | Kress et al. ................. 705/3 |
| 2011/0060703 A1* | 3/2011 | Alaniz ......................... 706/12 |

* cited by examiner

*Primary Examiner* — Luke Gilligan
(74) *Attorney, Agent, or Firm* — Mintz, Levin, Cohn, Ferris, Glovsky and Popeo, P.C.

(57) ABSTRACT

Various techniques are described that enable a smaller insurer (or an insurer with a less developed dataset) to be able to characterize whether certain healthcare insurance claim elements are potentially fraudulent or erroneous. Datasets from larger insurers (with well developed datasets) and/or datasets from a consortium of insurers can be leverage by the smaller insurer. Related techniques, apparatus, systems, and articles are also described.

14 Claims, 3 Drawing Sheets

HEALTHCARE INSURANCE CLAIM FRAUD DETECTION USING DATASETS DERIVED FROM MULTIPLE INSURERS

TECHNICAL FIELD

The subject matter described herein relates to techniques for detecting potential fraudulent healthcare insurance claims that utilizes datasets derived from multiple insurers or large insurers with well developed datasets.

BACKGROUND

Healthcare fraud is a growing problem in the United States and abroad.

According to the Centers for Medicare and Medicaid Services (CMS), fraud schemes range from those perpetrated by individuals acting alone to broad-based activities by institutions or groups of individuals, sometimes employing sophisticated telemarketing and other promotional techniques to lure consumers into serving as the unwitting tools in the schemes. Seldom do perpetrators target only one insurer or either the public or private sector exclusively. Rather, most are found to be simultaneously defrauding public sector victims such as Medicare and private sector victims simultaneously.

Annual healthcare expenditures continue to increase at rates exceeding inflation. Though the amount lost to healthcare fraud and abuse cannot be precisely quantified, the general consensus is that a significant percentage is paid to fraudulent or abusive claims. Many private insurers estimate the proportion of healthcare dollars lost to fraud to be in the range of 3-5%, which amounts to in excess of $100 billion annually. It is widely accepted that losses due to fraud and abuse are an enormous drain on both the public and private healthcare systems.

Variety of approaches have been tried to detect this fraud. Rules based systems have been deployed, which are relatively easy to build especially for new insurance providers who do not have enough historical data. But such systems can not cope with the exhaustive range of fraud and the rapid evolution in fraud techniques. A more robust approach is to use data driven analytics to capture relationship between the characteristics of claimant, service provider, pharmacy etc and the fraud patterns. Historically the insurance providers do not have reasonably large number of known fraud cases from SIU that could be used to train conventional supervised models, so unsupervised models are created to detect fraud. This approach can not only detect most of the known fraud patterns, it is flexible and scalable enough to keep up with the rapid evolution in fraud patterns.

Problems arise when an attempt is made to create fraud detection models for insurance providers with a relatively low number of claims. The data of such small or young insurance providers may lack longitudinal depth, cross-sectional breadth, or both. These conditions make it virtually impossible to create a general purpose robust fraud detection model using a customized data driven approach.

In the unsupervised modeling domain, rare combinations of events are flagged by computing statistics on these events. Traditionally, modelers have grappled with small datasets by being very conservative and flagging only extremely rare combinations of very common events. This is done by using smoothing techniques which smooth away events which are less common. Unfortunately this has an undesirable impact of failing to detect many existing fraudulent claims.

In addition, often during the efforts to identify fraudulent cases in insurance domain in general it is observed that data fragmentation is an issue. It hinders a comprehensive view of the problem and hence the model is unable to keep up with the changes in the business environment.

SUMMARY

In a first aspect, data characterizing an amount paid for a procedure can be received. The amount paid for the procedure (e.g., medical procedure/examination, laboratory test, prescription, etc.) can be compared with a global average A paid for the procedure. Based on the comparison, it is determined whether the amount paid for the procedure is erroneous or indicative of fraud if the amount paid for the procedure is outside a pre-determined deviation from the global average or the amount paid for the procedure is erroneous or indicative of fraud if the amount paid for the procedure is outside a pre-determined deviation from the global average. Once this determination is made, provision of data characterizing the determination can be provided.

In one implementation, the global average can be computed by:

$$A = (n_1 a_1 + n_2 a_2 + n_3 a_3 \ldots)/(n_1 + n_2 + n_3 \ldots),$$

$n_1, n_2, n_3 \ldots$ are populations of datasets 1, 2, 3 . . . , and $a_1, a_2, a_3 \ldots$ are averages for the corresponding datasets for the procedure.

In a second aspect, data characterizing at least one entity in a healthcare insurance claim is received. This data is transformed into a problem space $R^N$ that is computed using a dataset D derived from datasets from a plurality of healthcare insurers. Eigen vectors of $R^N$ are computed using D and a first M (<N) principal components of the Eigen vectors, $E_D$, are retained. A data point is projected from a dataset containing D or elements of D on M dimensional principal components followed by re-projection to the N dimensional space to compute divergence from the original position in the $R^N$ space. The divergence ($\epsilon$) indicates a degree of anomaly for the given data point. Thereafter, it can be determined either that the at least one healthcare entity has a potentially fraudulent or erroneous component if the divergence ($\epsilon$) is above a pre-defined threshold, or that the at least one healthcare entity is not potentially fraudulent and it does not include an erroneous component if the divergence ($\epsilon$) is within a pre-defined threshold. Once this determination has been made, provision of data (e.g., storage, transmission, display, etc.) indicating that the healthcare insurance claim is potentially fraudulent or erroneous based on the determination can be initiated.

Articles are also described that comprise a machine-readable medium (e.g., a non-transitory storage medium, etc.) embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. For example, the current subject matter allows for a consortium approach to detecting healthcare insurance claims that are indicative of fraud. The consortium approach is particularly beneficial to smaller insurances that may not have well developed data sets and/or in connection with specific claims that occur infrequently for insurers of any size. Moreover, the current approaches provides an arrangement that takes into account wide differences in healthcare claims processing which are widely variable by region, plan, and even carrier.

The details of one or more variations of the subject matter described herein are set forth in the accompanying drawings and the description below. Other features and advantages of the subject matter described herein will be apparent from the description and drawings, and from the claims thereby avoiding the need to manually define rules.

DETAILED DESCRIPTION

Figure 1:
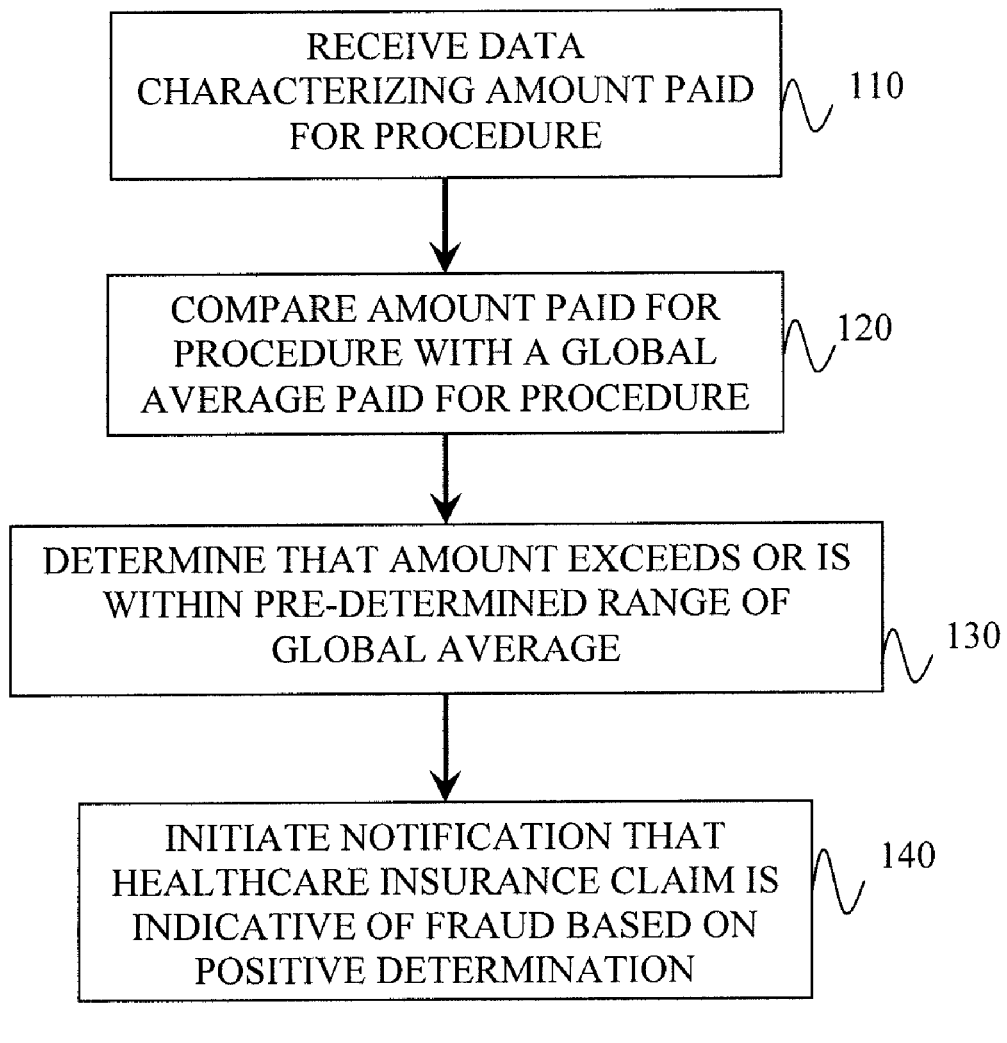
FIG. 1 is a process flow diagram illustrating a technique for healthcare insurance claim fraud and error detection using a first approach.

FIG. 1 is a process flow diagram illustrating a method 100, in which, at 110, data characterizing an amount paid for a procedure is received. Thereafter, at 120, the amount paid for the procedure is compared to a global average (i.e., an average from a more developed dataset or from a consortium of multiple insurers, etc.). It is then determined, at 130, (i) that the amount paid for the procedure is erroneous or indicative of fraud if the amount paid for the procedure is outside a pre-determined deviation from the global average or (ii) that the amount paid for the procedure is erroneous or indicative of fraud if the amount paid for the procedure is outside a pre-determined deviation from the global average. Provision of data (e.g., display, persistence, transmittal, etc.) characterizing such determination is, at 140, initiated.

Figure 2:
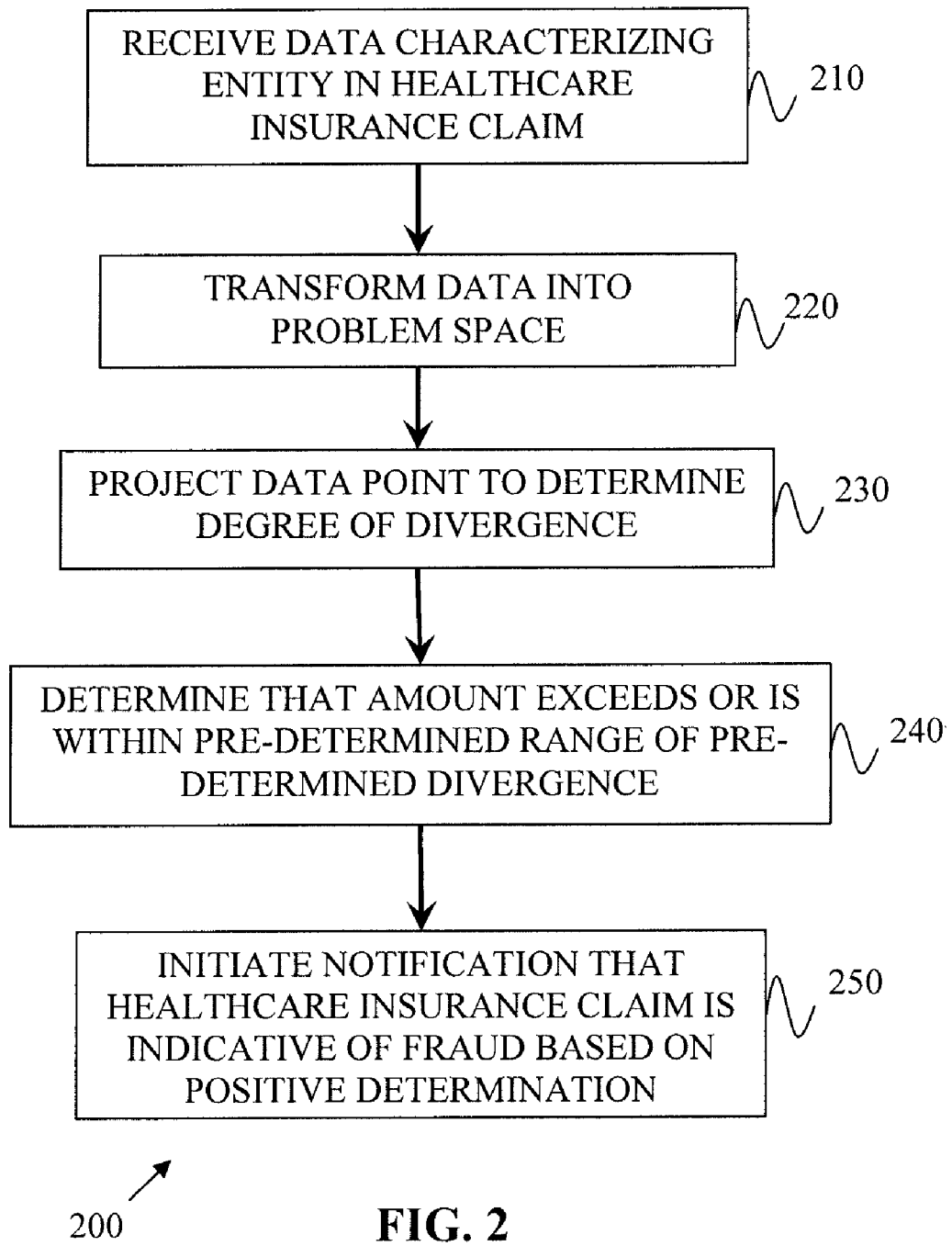
FIG. 2 is a process flow diagram illustrating a technique for healthcare insurance claim fraud and error detection using a second approach.

FIG. 2 is a process flow diagram illustrating a method 200, in which, at 210, data characterizing at least one entity in a healthcare insurance claim is received. Thereafter, at 220, the data is transformed into a problem space $R^N$. The problem space $R^N$ is computed using a dataset D derived from datasets from a plurality of healthcare insurers. Eigen vectors of $R^N$ are computed using D and a first M ($<$N) principal components of the Eigen vectors, $E_D$, are retained. A data point is projected, at 230, from a dataset containing D or elements of D on M dimensional principal components followed by re-projection to the N dimensional space to compute divergence from the original position in the $R^N$ space. The divergence ($\epsilon$) can indicate a degree of anomaly for the given data point. At 240, it is either determined (i) that the at least one healthcare entity has a potentially fraudulent or erroneous component if the divergence ($\epsilon$) is above a pre-defined threshold, or (ii) that the at least one healthcare entity is not potentially fraudulent and it does not include an erroneous component if the divergence ($\epsilon$) is within a pre-defined threshold. Data indicating that the healthcare insurance claim is potentially fraudulent or erroneous based on the determination is, at 250, then provided.

Figure 3:
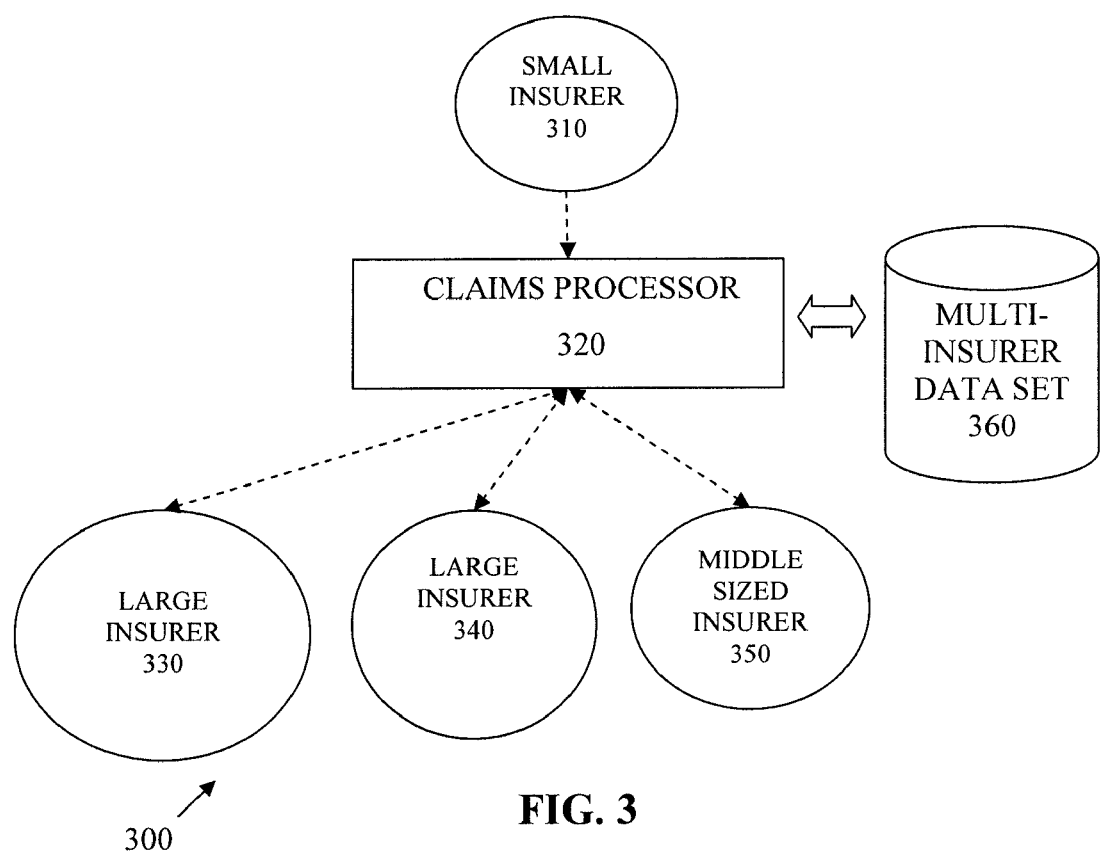
FIG. 3 is a diagram illustrating relationships among a small insurer and a claims processor that utilizes datasets obtained from a plurality of mid-sized and large insurers with more fully developed datasets as compared to the small insurer.

FIG. 3 is a diagram 300 illustrating a sample architecture in which a small insurer 310 is connected to a claims processor 320. The claims processor is also connected to first and second large insurers 330, 340 as well as a mid-sized insurer 350. These latter insurers 330-350 provide data sets to the claims processor 320 which are in turn used to generate a multi-insurer data set which can be persisted in a database 360. Each of the insurers illustrated in FIG. 3 can represent one or more computing systems (e.g., servers, etc.) which are in communication via computer networks (e.g., Internet, webservice, etc.). In one variation, single or small batches of claims are transmitted by the small insurer 310 which are then processed by the claims processor 320 according to the techniques described herein using the dataset in the database 360. While multiple insurers are illustrated as contributing to the dataset in the database 360, a well developed dataset from a larger insurer can be used alone in some implementations.

The current subject matter uses two different approaches in which claims from a smaller insurer can be analyzed in light of the claims (and their respective resolutions) with regard to a much larger insurer (or group of insurers). In other words, the current approach is not to mix the data in totality but to use only the essence of it to capture the results. The pool of datasets that combines either a dataset from a single large scale insurer or pools datasets from a plurality of insurers is referred to herein as consortium data.

Each individual healthcare claim within each dataset can contain many elements, including information such as the initiating healthcare service provider (which could be an individual doctor or a larger health organization such as a group of doctors or a hospital or clinic), the procedure being performed, the diagnosis code, where the service was performed (e.g., doctor's office, laboratory, hospital, emergency setting, etc.), and the type of service performed. All of these elements are categorical; these elements have no inherent ordering, and no inherent value attached to them. Some of these elements have hierarchies as well. Procedure codes, for example, can be grouped into categories with similar procedure codes. There can be one or more levels to these hierarchies.

In a first representative approach, in order to calculate the average amount paid for a procedure across the board, there is no longer a need to bring several datasets together themselves. Rather, a short summary of several datasets can suffice and then a global average can be computed using the following formula:

$$A=(n_1a_1+n_2a_2+n_3a_3\ldots)/(n_1+n_2+n_3\ldots),$$

Where,
A=global average
$n_1, n_2, n_3 \ldots$ are the population of the datasets 1, 2, 3 $\ldots$
$a_1, a_2, a_3 \ldots$ are the dataset averages Such an arrangement is a useful technique to combine the central tendencies of a set of tables meant to generate consortium statistics. Each individual procedure as part of a healthcare insurance claim can be analyzed in order to determine whether the requested reimbursement amount falls within a pre-defined range of the global average. Such an arrangement can also be advantageous to adjust to shifts in costs for particular procedures (as opposed to fixed reimbursement amounts which are not always accurate and up to date).

Once generated, these consortium statistics can be combined with a set of custom statistics using a variety of techniques. In general, these techniques heavily favor the custom statistics when there is sufficient data to make these statistics robust. In cases where there is insufficient data, consortium norms are relied upon more heavily. In this manner, reliable statistics can be generated across many entities (e.g., procedure codes) while maintaining as high a level of customization as is possible.

A second approach of using consortium data with out combining it with the "small" dataset is as follows:

Consortium dataset, D, is used to compute an N dimensional problem space $R^N$. Then the Eigen vectors of $R^N$ is computed using D and the first M (<N) principal components or the Eigen vectors, $E_D$, are retained.

The "small" dataset, d, under consideration is first transformed in to the $R^N$ space. Projection of a data point from d on the M dimensional principal components followed by re-projection to the N dimensional space would lead to divergence from the original position in the $R^N$ space. Computation of this divergence ($\epsilon$) indicates the degree of anomaly for the given data point vis a vis the distribution of Consortium data, D.

Instead if d had been used to compute the M principal components, $E_d$, and carried out the above described process, the calculated divergence ($\epsilon'$) would have indicated anomalous cases with respect the smaller dataset and not a more robust and comprehensive consortium dataset.

The current subject matter as it relates to the creation of create models can thus be used far and wide for even smaller insurance providers which do not have either the amount of data required to have stable statistics or the resources to make their datasets available to fraud modelers within a timeframe. Hence, the solution can be used to demonstrate the superior capabilities of a data driven model as compared to a rules-based system within a short span of time. In one arrangement, a first server associated with a small insurer can transmit healthcare insurance claim data to a second server (e.g., as a web service) with the calculations being described herein being performed on the second server.

The solution, by the virtue of being based on a larger dataset provides results that are far more stable and capture the interaction of variables better to identify a wider range of fraud. The results have been tested and, as expected, reduced the percentage of false positives, within the range of review, to give a higher hit rate.

There are at least two significant applications for the current subject matter. First, the current subject matter supplies a solution to small to mid-sized insurance carriers. Such carriers have generally been ignored by vendors of data driven statistics due to the difficulties in implementing a successful solution based, in part, on their respective limited datasets. There is a large pent up demand for these types of models among this market. Second, the current subject matter can be used to rapidly prepare proof of concepts (POCs). A potential client will often request a POC using some small subset of their data (e.g., all the claims accumulated in a particular month). Conventional POCs often required effort approaching full implementations requiring large volumes of data. Using the current methodology, rapid, inexpensive POCs can be performed to quickly provide potential clients with information about the value of the solutions presented herein.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. In addition, it will be appreciated that the techniques used herein may be used in connection with other non-healthcare claims or data structures in which variables may be extracted in order to determine whether such claim or data structure is atypical and requires additional review or analysis. Other embodiments may be within the scope of the following claims.

What is claimed is:

1. An article comprising a non-transitory machine-readable storage medium embodying instructions that when performed by one or more machines result in operations comprising:

receiving data characterizing at least one healthcare entity based on one, or a set of, healthcare insurance claims;

transforming the data into a problem space $R^N$, the problem space $R^N$ being computed using a dataset D derived from datasets from a plurality of healthcare insurers, wherein Eigen vectors of $R^N$ are computed using D and a first M (<N) principal components of the Eigen vectors, $E_D$, are retained;

projecting a data point from a dataset containing D or elements of D on M dimensional principal components followed by re-projection to the N dimensional space to compute divergence from the original position in the $R^N$ space, wherein M<N and the divergence (ε) indicates a degree of anomaly for the given data point;

determining (i) that the at least one healthcare entity has a potentially fraudulent or erroneous component if the divergence (ε) is above a pre-defined threshold, or (ii) that the at least one healthcare entity is not potentially fraudulent and it does not include an erroneous component if the divergence (ε) is within a pre-defined threshold; and initiating provision of data indicating that the healthcare insurance claim is potentially fraudulent or erroneous based on the determination.

2. An article as in claim 1, wherein the entity is selected from a group comprising: claim, procedure, physician, laboratory, and facility.

3. An article as in claim 1, wherein initiating provision of the data comprises one or more of: transmitting the data indicating that the healthcare entity or claim are potentially fraudulent or erroneous, displaying a notification indicating that indicating the healthcare insurance element or claim are potentially fraudulent erroneous, and persisting the data indicating that the healthcare entity or claim is potentially fraudulent erroneous.

4. An article as in claim 1, wherein initiating provision of the data comprises: identifying the entity as a basis for the determination that the healthcare insurance claims is potentially fraudulent.

5. An article as in claim 1, wherein the receiving data characterizing at least one entity in a healthcare insurance claim comprises: receiving, from a remote server, the data; and wherein initiating provision of data indicating that the healthcare insurance claim is potentially fraudulent or erroneous based on the determination.

6. An article as in claim 5, wherein the dataset containing D or elements of D comprises datasets from a plurality of insurers.

7. An article as in claim 5, wherein the dataset containing D or elements of D comprises a dataset from a single insurer.

8. A method for implementation by one or more data processors, the method comprising:

receiving data characterizing at least one healthcare entity based on one, or a set of, healthcare insurance claims;

transforming, by at least one data processor, the data into a problem space $R^N$, the problem space $R^N$ being computed using a dataset D derived from datasets from a plurality of healthcare insurers, wherein Eigen vectors of $R^N$ are computed using D and a first M (<N) principal components of the Eigen vectors, $E_D$, are retained;

projecting, by at least one data processor, a data point from a dataset containing D or elements of D on M dimensional principal components followed by re-projection to the N dimensional space to compute divergence from the original position in the $R^N$ space, wherein M<N and the divergence (ε) indicates a degree of anomaly for the given data point;

determining, by at least one data processor, (i) that the at least one healthcare entity has a potentially fraudulent or erroneous component if the divergence (ε) is above a pre-defined threshold, or (ii) that the at least one healthcare entity is not potentially fraudulent and it does not include an erroneous component if the divergence (ε) is within a pre-defined threshold; and initiating, by at least one data processor, provision of data indicating that the healthcare insurance claim is potentially fraudulent or erroneous based on the determination.

9. A method as in claim 8, wherein the entity is selected from a group comprising: claim, procedure, physician, laboratory, and facility.

10. A method as in claim 8, wherein initiating provision of the data comprises one or more of: transmitting, by at least one data processor, the data indicating that the healthcare insurance element or claim are potentially fraudulent or erroneous, displaying, by at least one data processor, a notification indicating that indicating the healthcare insurance element or claim are potentially fraudulent erroneous, and persisting, by at least one data processor, the data indicating that the healthcare insurance element or claim is potentially fraudulent erroneous.

11. A method as in claim 8, wherein initiating provision of the data comprises: identifying, by at least one data processor, the entity as a basis for the determination that the healthcare insurance claims is potentially fraudulent.

12. A method as in claim 8, wherein the receiving data characterizing at least one entity in a healthcare insurance claim comprises: receiving, from a remote server, the data; and wherein initiating provision of data indicating that the healthcare insurance claim is potentially fraudulent or erroneous based on the determination.

13. A method as in claim 12, wherein the dataset containing D or elements of D comprises datasets from a plurality of insurers.

14. A method as in claim 13, wherein the dataset containing D or elements of D comprises a dataset from a single insurer.

* * * * *